W. E. SEYMOUR.
AUTOMOBILE SIGNAL.
APPLICATION FILED AUG. 5, 1920. RENEWED MAR. 30, 1922.
1,436,117.
Patented Nov. 21, 1922.
4 SHEETS—SHEET 1.
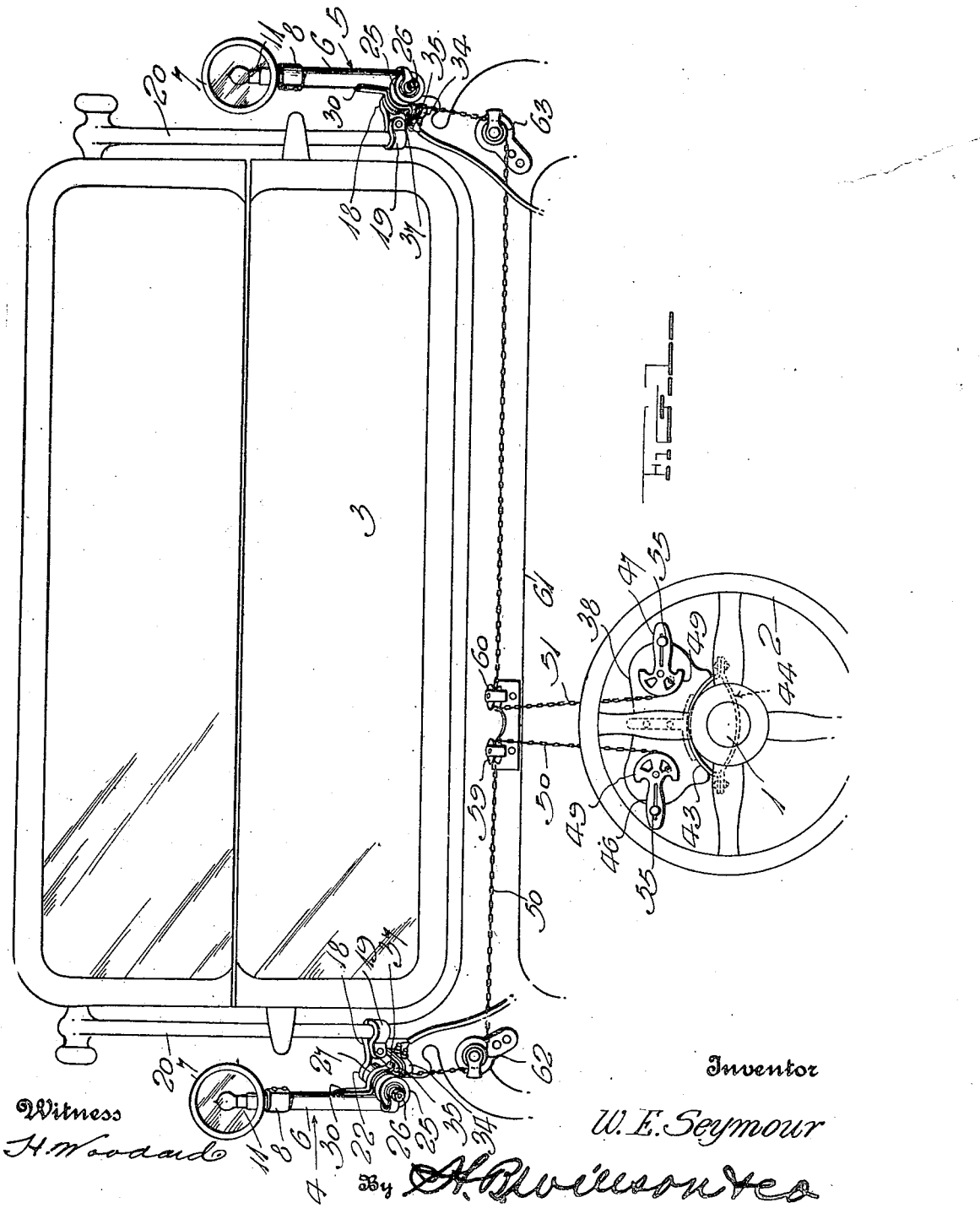
Witness
H. Woodard
Inventor
W. E. Seymour
By H. R. Willson &co.
Attorneys

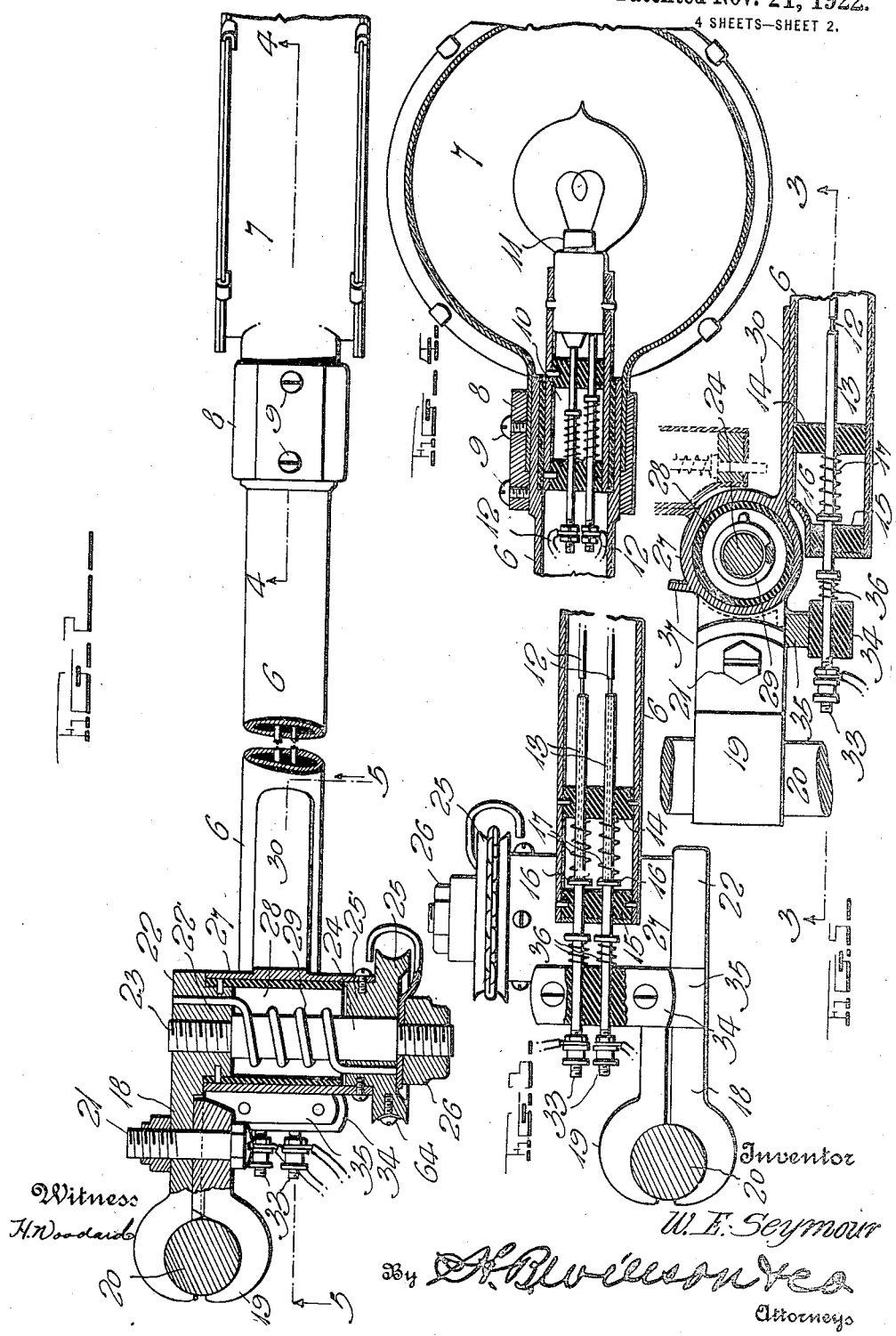
W. E. SEYMOUR.
AUTOMOBILE SIGNAL.
APPLICATION FILED AUG. 5, 1920. RENEWED MAR. 30, 1922.
1,436,117.
Patented Nov. 21, 1922.
4 SHEETS—SHEET 2.

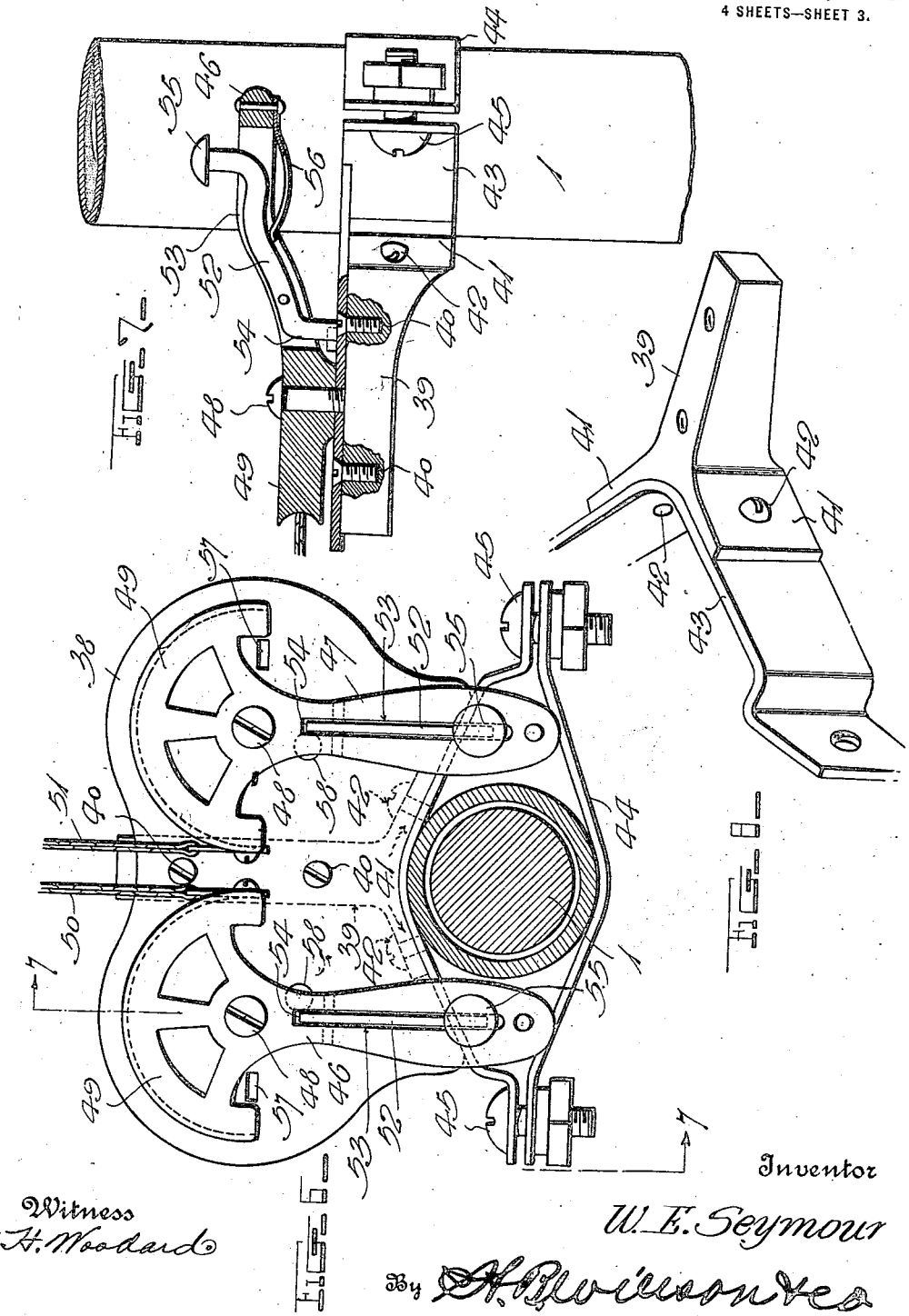

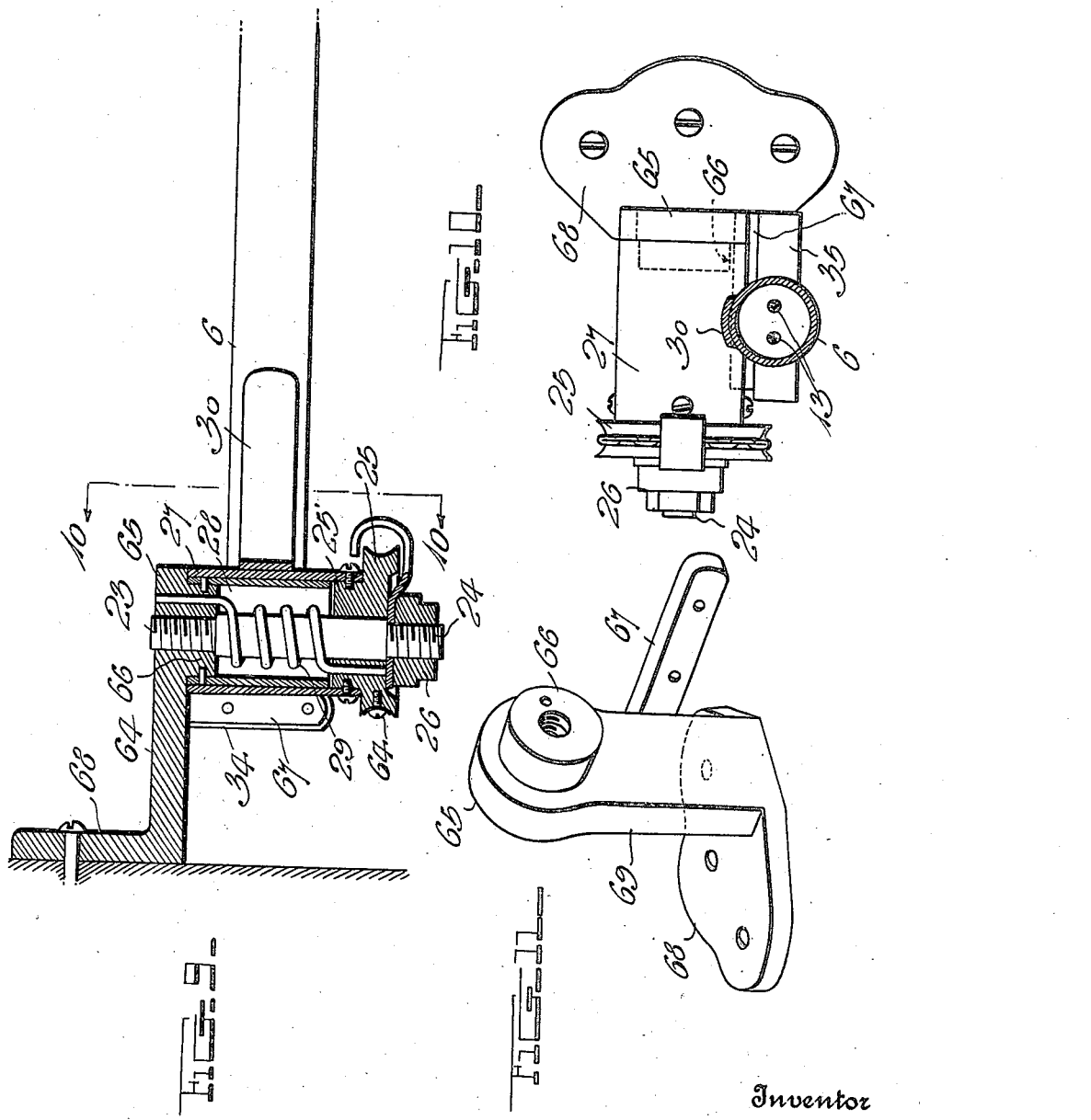

Patented Nov. 21, 1922.

1,436,117

UNITED STATES PATENT OFFICE.

WILLIAM EDWARD SEYMOUR, OF BUFFALO, NEW YORK.

AUTOMOBILE SIGNAL.

Application filed August 5, 1920. Serial No. 401,334. Renewed March 30, 1922. Serial No. 548,188.

*To all whom it may concern:*

Be it known that I, WILLIAM E. SEYMOUR, a citizen of the United States, residing at Buffalo, in the county of Erie and State of New York, have invented certain new and useful Improvements in Automobile Signals; and I do declare the following to be a full, clear, and exact description of the invention such as will enable others skilled in the art to which it appertains to make and use the same.

This invention relates to an improved automobile direction signal and one object of the invention is to provide a signal so constructed that it may be connected with the side bar or post of a windshield, the signal being yieldably held in an extended or operative position and provided with actuating means by means of which it may be drawn upwardly to an inoperative position.

Another object of the invention is to so construct the signal that the base portion carrying the arm and including the post engaging bracket may be provided with a drum rotatably mounted and having a spring positioned therein to yieldably retain the drum in a normal position with the signal carrying arm extending outwardly in an operative position.

Another object of the invention is to so construct this base portion that contacts may be provided to close an electric circuit and cause the lamp of the arm to be illuminated when the arm swings downwardly to an operative position.

Another object of the invention is to so construct the base portion of the signal that it may be limited in its upward swinging movement and to further so construct it that proper contact between the circuit closing terminals may be assured.

Another object of the invention is to so construct the base portion of this signal that it may be taken apart when necessary and easily and quickly put together again.

Another object of the invention is to so construct this signal that an actuating element may be provided upon the steering post including a lever pivotally mounted and permitted of being locked when the signal arm is swung to a raised or inoperative position.

Another object of the invention is to so construct the actuating means carried by the steering post that it may be securely but releasably connected with the steering post in a convenient position for use.

Another object of the invention is to so construct the signal that one of the signals may be connected with each side of the windshield and actuating levers for the signals mounted upon the bracket plate which will be connected with the steering post.

This invention is illustrated in the accompanying drawings, wherein:

Figure 1 is a view in elevation showing the signal apparatus connected with the windshield and steering post of an automobile, Figure 2 is an enlarged view showing the arms swung downwardly to an operative position and the base portion in section, Figure 3 is a view showing the base portion of the signal in bottom plan and the inner end portion of the signal arm and contact carrying block of the base in section, along the line 3—3 of Fig. 5, Figure 4 is a sectional view taken along the line 4—4 of Fig. 2, Figure 5 is a sectional view taken along the line 5—5 of Fig. 2, Figure 6 is an enlarged view showing the steering post in section and the actuating mechanism carried thereby in top plan, Figure 7 is a sectional view taken along the line 7—7 of Figure 6, and Figure 8 is a perspective view of the plate carrying horn and clamping strips for connecting the horn with the steering post.

Figure 9 is a view similar to Fig. 2 showing a modified construction.

Figure 10 is a section along the line 10—10 of Fig. 9.

Figure 11 is a perspective view of the bracket.

This signal includes actuating means carried by the steering post 1 upon which the usual steering wheel 2 will be mounted and signalling means which will be positioned upon opposite sides of the windshield 3 and connected with the actuating means of the steering post so that either of the signalling means may be caused to swing outwardly and downwardly to an operative position according to the direction in which a turn is to be made. The two signalling means have been shown in Fig. 1 and designated in general by the numerals 4 and 5 and since they are of a duplicate construction, a detailed description of one will suffice. The signalling means is illustrated in detail in Figures 2 through 5 and reference will now be had to these figures.

The tubular arm 6 of the signal is provided at its upper end with a head 7 which is secured in place by means of a collar 8 and screws 9 and this arm 6 carries a socket 10 including contacts so that when the base of the bulb 11 is inserted into the socket, the proper contact may be formed so that the bulb may be illuminated. The conductor wires 12 extend through this arm 6 and have their lower ends passed through and soldered to the outer ends of plungers 13 which are mounted in an insulating block 14 and extend through an insulating block 15. Abutments 16 are mounted upon these plungers 13 and are engaged by the springs 17 so that the plungers will be yieldably held in an extended position as shown. It will thus be seen that this arm is provided with a socket at its upper end for carrying the bulb 11 and at its lower end is provided with contact pins or plungers which are yieldably held in an extended position to permit of proper engagement with other contacts when the arm is swung downwardly to the position shown in full lines in Fig. 5.

The base portion of this signal is provided with a clamp including a jaw 18 and a second jaw 19 between which the post 20 of the windshield will be tightly gripped when these jaws are brought together and held in tight engagement with the post by means of the bolt 21. The jaw 18 has its shank terminating in a head 22 having a threaded opening formed therein to receive the reduced and threaded end 23 of the shaft 24. This shaft 24 has a drum 25 loosely mounted thereon and held in place by a securing nut 26. A sleeve 27 is secured upon the reduced portion 25' of the drum as shown in Fig. 2 and turns upon the reduced portion 22' of the head 22, a bushing sleeve 28 which is formed of steel or similar material being positioned within the sleeve 27 and secured to the reduced portion of the head 22. It will thus be seen that the sleeve 27 may rotate upon the shaft 24 with the drum 25 and may be yieldably held in a set position by the spring 29 coiled about the shaft 24 and having one end portion embedded in the head 22 and the second end portion embedded in the drum 25. An arm 30 extends from the sleeve 27 and the lower or inner end portion of the post 6 is connected with this arm 30 by having the arms brazed to the post. It will thus be seen that the post 6 will be securely connected with the base so that it will not work loose.

From an inspection of Fig. 5, it will be seen that when the post 6 is swung outwardly and downwardly to the operative position by the spring, this post will extend parallel to the clamping bracket and the contact pins 13 will engage the contact pins 33 which are slidably carried by the insulating block 34 mounted upon the side arm 35 of the jaw 18 and yieldably held against movement by the spring 36. Therefore, when the signal is swung down to the operative position, contact will be made between the contact pins 13 and 33 and a circuit will be completed, thus causing the lamp to be illuminated. When the arm returns to the vertical position, indicated by the dotted lines of Fig. 5 and shown in Fig. 1 in full lines, the circuit will be broken and the lamp extinguished. An abutment 37 extends from the sleeve 27 and will engage the side arm 35 to limit rotary movement of the sleeve under action of the spring and thus stop rotation of the sleeve when the post or arm 6 is in a vertical position.

In order to cause the signal to be swung to an inoperative position, there has been provided actuating means shown in Fig. 1 and also shown in detail in Figures 6, 7 and 8. This actuating mechanism includes a plate 38 which is secured to the horn 39 by screws 40. This horn 39 is provided with side wings 41 through which pass securing screws 42 for connecting the horn with a clamping strip 43. This clamping strip 43 extends upon one side of the steering post and a second strip 44 extends upon opposite side of the post. Securing bolts 45 pass through perforations in the ends of the two strips 43 and 44 and thus the post will be securely clamped between the strips and the horn 39 securely connected with the post. Levers 46 and 47 are pivotally connected with the plate 38 by the screw-pins 48 and each of these levers is provided with a segmental head 49 having a groove in its periphery so that the chains 50 and 51 which are connected with the heads will not slip out of engagement therewith when the levers are turned. A latch 52 is provided for each lever and is pivotally mounted in a longitudinally extending slot 53 and has one end portion bent to provide a finger 54 and the outer end portion extended upwardly and provided with a head 55 so that the latch can be easily swung against the action of the spring 56 to draw the finger 54 upwardly out of engagement with the plate 38. This spring will normally retain the latch in the position shown in Fig. 7 and will serve to move the latch to extend the pin into the opening 57 so that when the lever is swung to draw upon its line, the finger 54 of the latch will enter the opening 57 and the lever will be held in this adjusted position with the signal connected therewith by the chain or line drawn up to the inoperative position. When it is desired to permit the signal to move to the operative position, the head 55 of the latch will be pressed upon and the latch will move out of the opening 57 thus releasing the lever and permitting it to be returned to the position shown in Fig. 6, the abutment pin or lug 58 engaging the finger 54 of the latch to limit swinging movement of the lever as shown. The chains or lines 51 are carried forwardly and are passed about the pulley wheels 59 and 60 carried by the bracket plate 61 secured to the windshield and the chains are then extended outwardly and passed about the guide pulleys 62 and 63 and then extended to the signal where they are connected with the drums 25 by removable fasteners such as the screws 64 shown in Fig. 2.

When in use, the signals will be connected with the automobile as shown in Fig. 1 with one upon each side of the windshield and the actuating mechanism secured to the steering post. When it is desired to make a turn, the lever for the signal upon the side of the machine corresponding to the turn to be made is released and the spring 29 moves the signal arm downwardly thus indicating that a turn is to be made in this direction. As soon as the turn is made, the lever will be returned to the original position and will return the arm to the raised position. If the machine is to be brought to a stop, both arms may be swung down. It will thus be seen that with this device the direction of the turn can be indicated and further that at night the signal may be illuminated when swung to an operative position and extinguished when returned to the raised or inoperative position. Therefore, waste of current will be prevented. If it is desired to connect the device with the body of the automobile instead of with the windshield the jaw 19 will be done away with and the bracket 64 shown in Figures 9, 10 and 11 substituted for the jaw 18. This bracket is very similar to the jaw 18 and is provided with a head 65 having a reduced extension 66 corresponding to the head 22 and reduced extension 22'. This bracket is further provided with an arm 67 for carrying the block 35 and it will thus be seen that main difference between the jaw 18 and the bracket 64 is the provision of the foot 68 through which the fasteners will be passed to connect the bracket with the body of the automobile.

I claim:

1. A direction indicator comprising a base adapted for connection with a portion of a vehicle and including a head, a bushing sleeve carried by the head, a shaft carried by the head, a drum loosely fitting upon the shaft, a sleeve carried by the drum and rotatable upon the bushing sleeve and having an arm extending at a point intermediate its length, a spring wound upon the shaft and having one end connected with said head and the second end with said drum, a post connected with said arm and having a signal head at its free end, indicating means carried by the post and positioned in the signal head, the sleeve carried by the drum rotating therewith upon the bushing sleeve for swinging the post when the drum is rotated.

2. A direction indicator comprising a clamp including jaws, one jaw being extended to provide a head, a shaft carried by the head, a drum loose upon the shaft, a spring carried by the shaft and having one end connected with the head and the second with the drum to yieldably hold the drum against rotation and return the drum to a normal position, a sleeve positioned about the shaft and connected with the drum for rotating with the same, a post connected with the sleeve, and indicating means carried by the free end portion of the post.

3. A direction indicator comprising a base adapted for connection with a portion of a vehicle, a shaft carried by said base, a drum loose upon said shaft, a spring having one end connected with said base and the second end with said drum to yieldably hold the drum against rotation and return the drum to a normal position, a post connected with the drum and having a swinging movement when the drum is rotated, and indicating means carried by the free end portion of the post.

In testimony whereof I have hereunto set my hand.

WILLIAM EDWARD SEYMOUR.